United States Patent
Araújo et al.

(10) Patent No.: US 11,854,234 B2
(45) Date of Patent: *Dec. 26, 2023

(54) CALIBRATION OF MOBILE ELECTRONIC DEVICES CONNECTED TO HEADSETS WEARABLE BY USERS

(71) Applicant: Telefonaktiebolaget LM Ericsson (publ), Stockholm (SE)

(72) Inventors: José Araújo, Stockholm (SE); Leonard Bruns, Naståtten (DE); Diego Gonzalez Morin, Galapagar (ES); Ioannis Karagiannis, Stockholm (SE); AmirHossein Taher Kouhestani, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/706,731

(22) Filed: Mar. 29, 2022

(65) Prior Publication Data

US 2022/0215586 A1    Jul. 7, 2022

Related U.S. Application Data

(63) Continuation of application No. 16/500,976, filed as application No. PCT/EP2018/082087 on Nov. 21, 2018, now Pat. No. 11,321,874.

(51) Int. Cl.
  *G06T 7/80* (2017.01)
  *G06T 7/70* (2017.01)
  (Continued)

(52) U.S. Cl.
  CPC ............ *G06T 7/85* (2017.01); *G02B 27/0025* (2013.01); *G02B 27/0093* (2013.01);
  (Continued)

(58) Field of Classification Search
  CPC . G06F 3/16; G06F 3/013; G06T 11/60; G06T 7/85; G06T 7/70; G09G 5/391;
  (Continued)

(56) References Cited

U.S. PATENT DOCUMENTS

2017/0221270 A1 * 8/2017 Goslin ................... G10L 15/22
2018/0340982 A1   11/2018 Kohtz et al.
2020/0098387 A1    3/2020 Hardek

FOREIGN PATENT DOCUMENTS

| CN | 105929543 A | 9/2016 |
| CN | 206990924 U | 2/2018 |
| WO | 2018208465 A1 | 11/2018 |

OTHER PUBLICATIONS

International Search Report and Written Opinion of the International Searching Authority for PCT International Application No. PCT/EP2018/082087 dated Aug. 8, 2019.

(Continued)

*Primary Examiner* — Phuoc H Doan
(74) *Attorney, Agent, or Firm* — SAGE PATENT GROUP

(57) ABSTRACT

A mobile electronic device is provided for use with a headset. A camera outputs digital pictures of a portion of the headset. A display device displays information for viewing by a user wearing the headset. A processor retrieves calibration parameters that characterize at least a pose of the camera relative to the display device, and processes a digital picture from the camera to identify a pose of an optically identifiable feature within the digital picture. A pose of the mobile electronic device is identified relative to the holder based on the identified pose of the optically identifiable feature within the digital picture and based on at least the pose of the camera relative to the display device as characterized by the calibration parameters. The processor controls where graphical objects are rendered on the display device (Continued)

based on the identified pose of the mobile electronic device relative to the holder.

19 Claims, 8 Drawing Sheets

(51) Int. Cl.
*G02B 27/00* (2006.01)
*G02B 27/01* (2006.01)

(52) U.S. Cl.
CPC .............. *G02B 27/017* (2013.01); *G06T 7/70* (2017.01); *G02B 2027/0138* (2013.01); *G06T 2207/30244* (2013.01)

(58) Field of Classification Search
CPC .. A61B 34/20; G02B 27/017; G02B 27/0093; G02B 27/0025; H04N 19/124
See application file for complete search history.

(56) References Cited

OTHER PUBLICATIONS

Tuceryan et al., "Single point active alignment method (SPAAM) for optical see-through HMD calibration for AR," in Proceedings of the IEEE and ACM International Symposium on Augmented Reality (ISAR 2000), Oct. 5-6, 2000, pp. 149-158.
Examination Report for Indian Patent Application No. 202147026813 dated Mar. 22, 2022 (5 pages).

\* cited by examiner

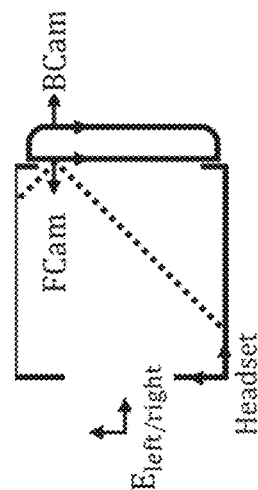
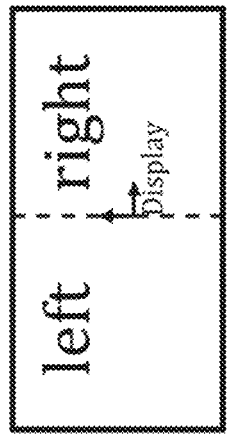
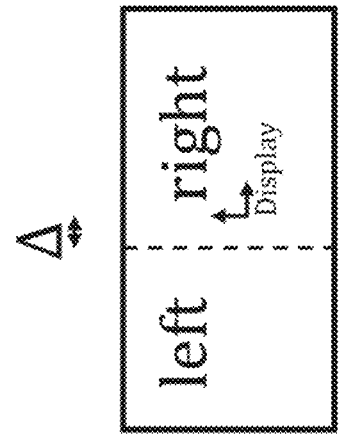
FIG. 11a
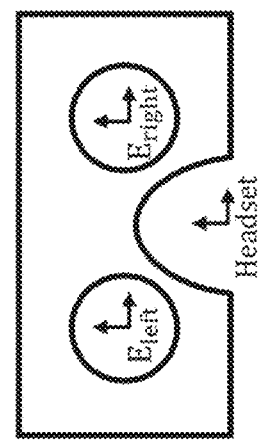
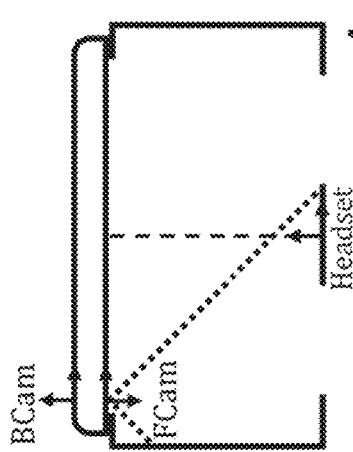
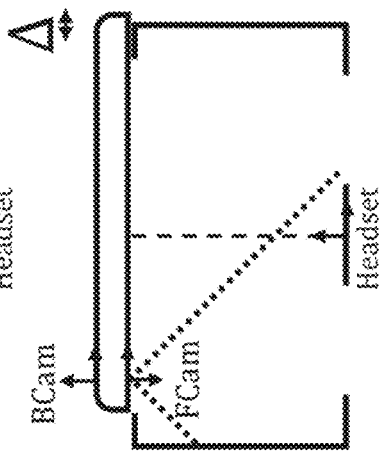
FIG. 11b
FIG. 11c

CALIBRATION OF MOBILE ELECTRONIC DEVICES CONNECTED TO HEADSETS WEARABLE BY USERS

CROSS REFERENCE TO RELATED APPLICATION

This application is a continuation of U.S. patent application Ser. No. 16/500,976 filed on Oct. 4, 2019, which itself is a 35 U.S.C. § 371 national stage application of PCT International Application No. PCT/EP2018/082087, filed on Nov. 21, 2018, the disclosure and content of which is incorporated herein by reference in its entirety.

TECHNICAL FIELD

The present disclosure relates to head mounted displays that use mobile electronic devices to display information for viewing by wearers.

BACKGROUND

Head mounted displays (HMDs) will be an increasing part of future device ecosystem used by society for interpersonal communication, gaming and other applications. Mixed Reality (MR) headsets are a type of HMD that augments what a user sees in the real world with computer generated information (e.g., graphical objects, text, indicia, etc.) in a way that can make the information appear to the user as if it exists in the real world. MR headsets can enable a user to interact in a seemingly real or physical way using special electronic equipment, such as a haptic device that tracks movement of the user and which may provide haptic feedback to the user.

Smartphone or other mobile electronic device-based MR headsets are becoming increasing popular, with several startups launching new devices in 2017 and 2018 called Mira Prism, Holokit, Ghost AR, Lenovo Mirage AR. These headsets are relatively inexpensive and can be used with smartphones by Apple, Samsung, Google, and others. For example, developers for the Ghost and Holokit devices can utilize Google's and Apple's MR software development kit (SDK) tools, called ARCore and ARKit, respectively, to perform object recognition and 6 degree-of-freedom (DOF) localization. The Ghost device can also be used in virtual reality (VR) by changing the frontal lens from see-through to non-see-through. On the full VR spectrum, Google Cardboard, Google Daydream and Samsung Gear VR are smartphone-based VR headsets which are also low cost and have a high popularity.

MR headsets can generally be characterized into two categories, a mirror-less headset (e.g. Mira Prism type headset depicted in FIGS. 1 and 2 and Holokit and Ghost headsets) and a mirror-based headset. For a mirror-less headset, light emitted by a display device of a mobile electronic device 120 (e.g., smartphone) is projected toward a lens 110 (e.g., along path 200a). The lens 110 is at least partially transparent (i.e., see-through) to allow ambient light to pass through for viewing by a user who is wearing the MR headset while also being configured to reflect at least part of the light that is emitted by the display device backward for viewing by the user. The lens 110 may or may not have light concentrating or light dispersing effects (e.g., magnifying light from real-world features). In FIGS. 1 and 2, the lens 110 reflects the light toward the user's eyes (e.g., along path 200b, predominantly by virtue of specular reflection) and toward a camera 122 of the device 120 (e.g., along path 200c, by virtue of diffusive reflection). In contrast, for a mirror-based headset, the light emitted by the display device of the mobile electronic device 120 is projected toward a mirror which reflects light toward a reflective see-through lens for reflection which can be directly or indirectly toward a user's eyes.

Some mirror-based headsets configure a back facing camera of the mobile electronic device 120 to have a field-of-view of the world, which is beneficial because the back camera can be configured to provide better quality video than a front camera. For example, current versions of the ARCore or ARKit SDKs can only operate effectively using the back camera due to its higher quality imaging relative to the front camera. Some mirror-based headsets enable more flexible positioning of the mobile electronic device than can be allowed for mirror-less headsets due constrains of the relative positioning between the see-through lens of the headset and the display device of the mobile electronic device.

A MR system can operate by having a display device of the mobile electronic device project information and other virtual content toward the headset lens (mirror-less design) or the headset mirror (mirror-based design). Digital pictures (e.g., video frames) from the camera are processed to identify real-world features, such as tracking markers or other real-world objects, which can be used for positioning (e.g. to interrelate real-world and virtual-world (i.e., MR headset reference) coordinate systems), feature recognition, and/or for streaming video to a remote viewer (e.g. for learning/teaching MR applications enabling a remote expert to view video captured by the technician's MR headset and provide responsive guidance).

One of the main drawbacks with these low-cost headsets is a noticeable lower quality of three-dimensional (3D) virtual content (e.g. distortion, blurriness, contrast, location in the real world) rendered by the headset when the mobile electronic device is not optimally posed (e.g., position and angularly oriented) relative to the headset. Referring to FIG. 1, two images can be displayed by the mobile electronic device which allow for the user to perceive a 3D image in the headset lens. If the two displayed images are not correctly aligned with the lens, the user will view a distorted image. Moreover, if the location of the virtual content to be displayed is defined according to a real-world location inferred by the mobile electronic device camera (e.g. the device tracks a marker and a virtual content is to be augmented on top of the marker which is one of the most common AR applications), or if the mobile electronic device is not correctly posed in the headset, the transform between the camera and the headset lens (where the virtual content appears) will change. This will impact the user experience negatively as the virtual content will no longer be aligned with the real-world content.

Additionally, if calibration algorithms are performed while the mobile electronic device has a particular pose, the calibration will no longer be valid if the user subsequently replaces the mobile electronic device with a pose that is different from when the calibration was earlier performed. Moreover, the relative pose between the mobile electronic device and headset will change if the mobile electronic device slips relative to the headset during use.

The reason why the mobile electronic device may be posed sub-optimally in the headset is that mobile electronic devices have many different sizes (length, width and thickness) which complicates how the headsets should be configured to releasably retain the varying mobile electronic devices. Hence, substantial variability may result in how a same user poses a mobile electronic device and how different users pose their mobile electronic devices relative to the headset. To avoid performance degradation due to such variability, the Samsung Gear VR headset only works with Samsung brand devices for which Samsung has made device-specific holder attachments that constrain how Samsung devices are posed relative to the headset.

SUMMARY

Some embodiments disclosed herein are directed to a mobile electronic device for a headset that includes a holder configured to releasably retain the mobile electronic device in a defined pose relative to the headset. The mobile electronic device includes a camera, a display device, a processor, and a memory. The camera is configured to output digital pictures and arranged by the holder to view a portion of the headset. The display device is arranged by the holder to display information for viewing by a user wearing the headset. The processor is operationally connected to the camera and to the display device. The memory stores program code that is executed by the processor to perform operations. The operations include retrieving calibration parameters from the memory that characterize at least a pose of the camera relative to the display device. The operations process a digital picture from the camera to identify a pose of an optically identifiable feature within the digital picture that was captured while the mobile electronic device is retained by the holder. The operations identify a pose of the mobile electronic device relative to the holder based on the identified pose of the optically identifiable feature within the digital picture and based on at least the pose of the camera relative to the display device as characterized by the calibration parameters. The operations control where graphical objects are rendered on the display device based on the identified pose of the mobile electronic device relative to the holder.

A potential advantage that may be provided by these and other embodiments is that the mobile electronic device can optimize its operation to compensate for how the device is determined to be posed relative to the headset. Thus, for example, when the mobile electronic device is placed in the headset with the display device laterally offset from a preferred location, the mobile electronic device can determine such offset and adjust its operation to more optimally display information for viewing by a user who is wearing the headset. Alternatively or additionally, the mobile electronic device can provide guidance to a user as to how the pose of the mobile electronic device should be adjusted.

Some other embodiments disclosed herein are directed to corresponding methods of performing operations by a processor of a mobile electronic device. As explained above, the mobile electronic device includes a camera and a display device for use with a headset having a holder configured to releasably retain the mobile electronic device in a defined pose relative to the headset. The method includes retrieving calibration parameters that characterize at least a pose of the camera relative to the display device. The method processes a digital picture from the camera to identify a pose of an optically identifiable feature within the digital picture that was captured while the mobile electronic device is retained by the holder. The method identifies a pose of the mobile electronic device relative to the holder based on the identified pose of the optically identifiable feature within the digital picture and based on at least the pose of the camera relative to the display device as characterized by the calibration parameters. The method controls where graphical objects are rendered on the display device based on the identified pose of the mobile electronic device relative to the holder.

Other mobile electronic devices and corresponding methods according to embodiments will be or become apparent to one with skill in the art upon review of the following drawings and detailed description. It is intended that all such additional mobile electronic devices and methods be included within this description and protected by the accompanying claims.

BRIEF DESCRIPTION OF THE DRAWINGS

Aspects of the present disclosure are illustrated by way of example and are not limited by the accompanying drawings. In the drawings:

FIG. 11a illustrates a back view of a headset and a side cross-sectional view of the headset retaining a mobile electronic device having a front camera (FCam) and a back camera (BCam);

FIG. 11b illustrates a top cross-sectional view and a front cross-sectional view of the headset retaining the display device of the mobile electronic device at an optimal position relative to the headset;

FIG. 11c illustrates a top cross-sectional view and a front cross-sectional view of the headset retaining the mobile electronic device at a sub-optimal laterally shifted offset (delta) position relative to the headset.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Figure 1:
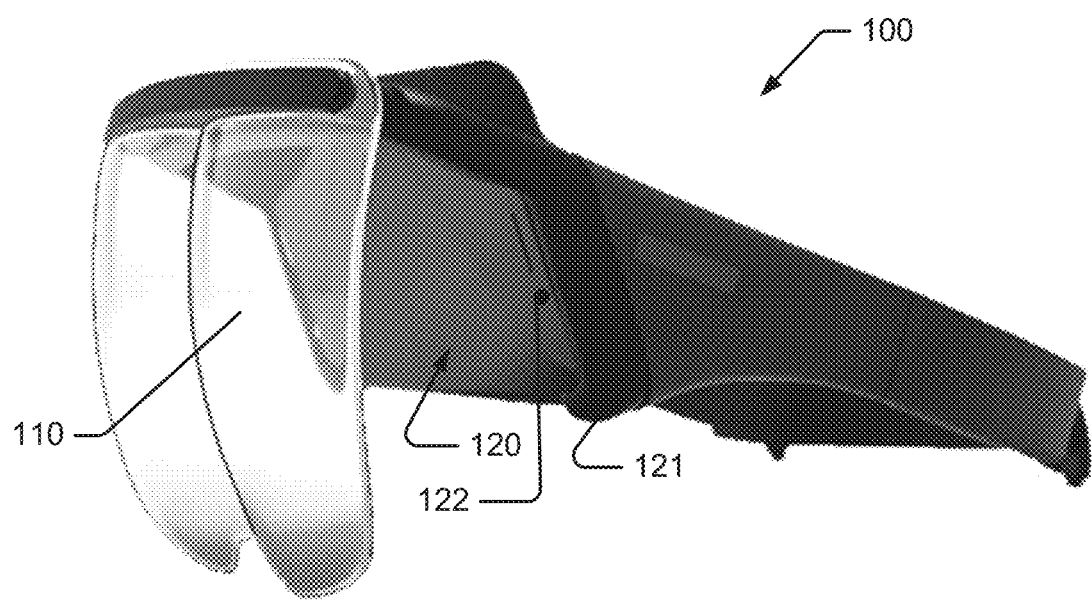
FIG. 1 illustrates a MR system that includes a MR headset that holds a mobile electronic device which is configured to operate in accordance with some embodiments of the present disclosure.

FIG. 1 illustrates a MR system that includes a MR headset 100 that holds a mobile electronic device 120 which is configured to operate in accordance with some embodiments of the present disclosure. Referring to FIG. 1, the MR headset 100 includes a lens 110 through which a user who is wearing the MR headset can view real-world features and further includes a holder 121 that is configured to releasably retain the mobile electronic device 120 in a defined orientation relative to the lens 110.

Figure 10:
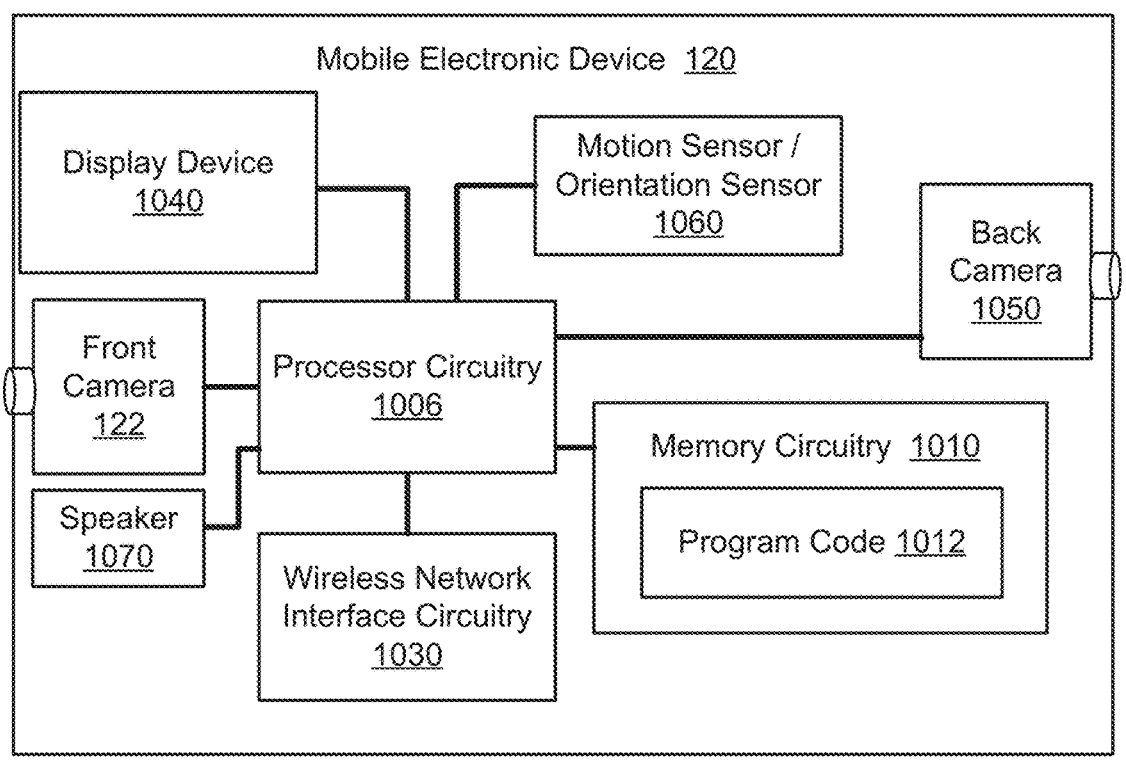
FIG. 10 is a block diagram of components of a mobile electronic device that are configured to operate in accordance with some other embodiments of the present disclosure.

The mobile electronic device 120 includes a camera 122, display device (1040 in FIG. 10), and a processor (1006 in FIG. 10). The camera 122 is configured to output digital pictures (e.g., still pictures and/or video) and arranged by the holder 121 to view at least a portion of the lens 110 of the MR headset 100. The display device 1040 is arranged to display information that is projected on the lens 110 for reflection directly or indirectly toward the user's eyes, i.e., while wearing the MR headset 100, and the camera 122 of the mobile electronic device 120. Although not shown, the headset may include intervening mirrors that are positioned between the lens 110 and the user's eyes and/or the camera 122 and, hence the light may be reflected directly or indirectly toward the user's eyes and/or the camera 122.

The mobile electronic device 120 can include, but is not limited to, a smart phone, a palmtop computer, a tablet computer, gaming device, or other computing device. A "mobile electronic device" is also referred to herein as a "mobile device" and "device" for brevity. As will be explained in further detail below, various operations that are described below as being performed by the mobile electronic device 120 may additionally or alternatively be performed by another electronic device that is communicatively connected to the mobile electronic device 120.

Figure 2:
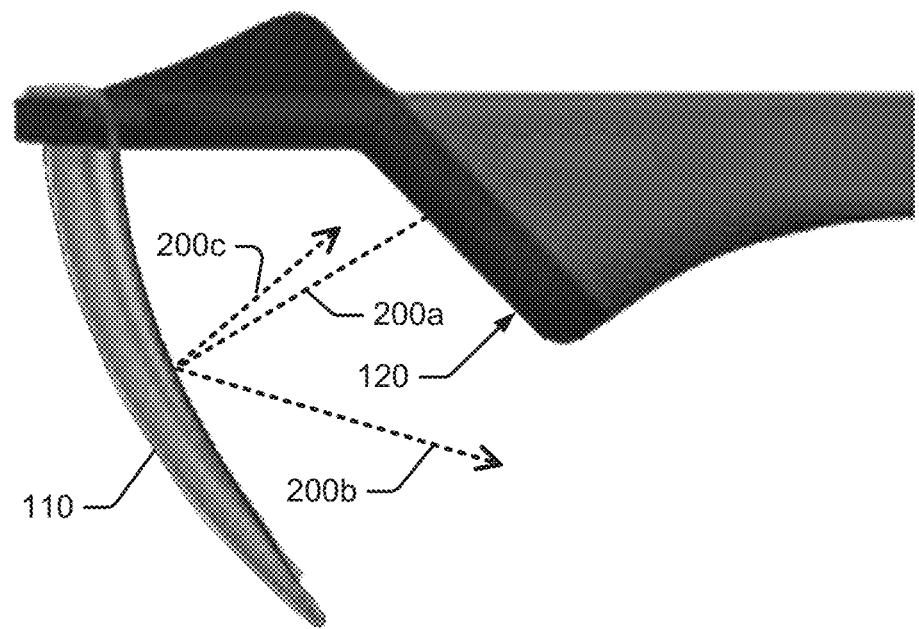
FIG. 2 illustrates a side view of the MR system of FIG. 1.

FIG. 2 illustrates a side view of the MR system of FIG. 1. Referring to FIG. 2, the display device 1040 (FIG. 10) of the mobile electronic device 120 displays information that is projected along path 200a onto the lens 110 for reflection backward along path 200b toward the user's eyes and along path 200c toward the camera 122.

Figure 3:
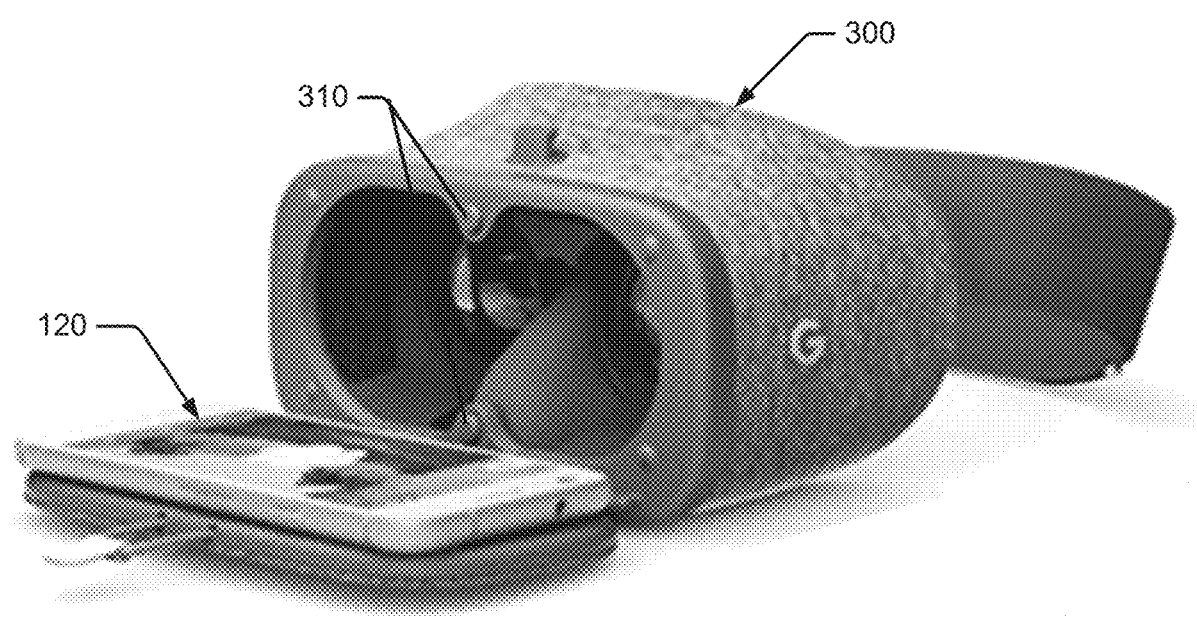
FIG. 3 illustrates another embodiment of a VR system with a mobile electronic device having a display device that projects images toward a user and which are partially reflected toward a camera in accordance with some embodiments of the present disclosure.

FIG. 3 illustrates another configuration of a VR headset 300 that may be used according to some embodiments. Referring to FIG. 3, the display device 1040 (FIG. 10) of the mobile electronic device 120 displays information that is projected toward lenses through which a user views the display device 1040. Images from the display device 1040 can also be reflected by the lenses and/or the user's eyes back to the camera 122 (FIG. 10).

One approach for attempting to determine the pose of a mobile electronic device 120 relative to a MR headset, which has been implemented by the Google Daydream VR, is to use two conductive pads 310 (FIG. 3) which are configured to contact the display device 1040 (FIG. 10). The mobile electronic device 120 can then measure the location of the pads 310 based on where they contact the touch-sensitive display device, and determine therefrom the position of the mobile electronic device 120 relative to the headset 300. Moreover, the mobile electronic device 120 can measure the orientation in roll with respect to the headset 300. However, the mobile electronic device 120 would not be able to measure displacement in other orientations. This approach also requires the pads to be built in the headset 300, making it more complex and expensive to be fabricated, while requiring the smartphone to be detecting contacts in the display device while running the MR application. Also, the requirement that the pads 310 touch the display device, reduces the display area in which content can be displayed for viewing by the user.

Embodiments of the present disclosure are directed to calibrating the pose of a mobile electronic device relative to a headset so that the virtual content can be rendered to allow more optimal viewing by the user wearing the headset. Results of one or more earlier calibration operations can be used to facilitate and improve a present calibration operation.

As used herein, the term "pose" refers to the position and/or the rotational angle of one device (e.g., mobile electronic device) relative to another device (e.g., headset) or to a defined coordinate system. A pose may therefore be defined based on only the multidimensional position of one device relative to another device or to a defined coordinate system, only on the multidimensional rotational angles of the device relative to another device or to a defined coordinate system, or on a combination of the multidimensional position and the multidimensional rotational angles. The term "pose" therefore is used to refer to position, rotational angle, or combination thereof.

Figure 4:
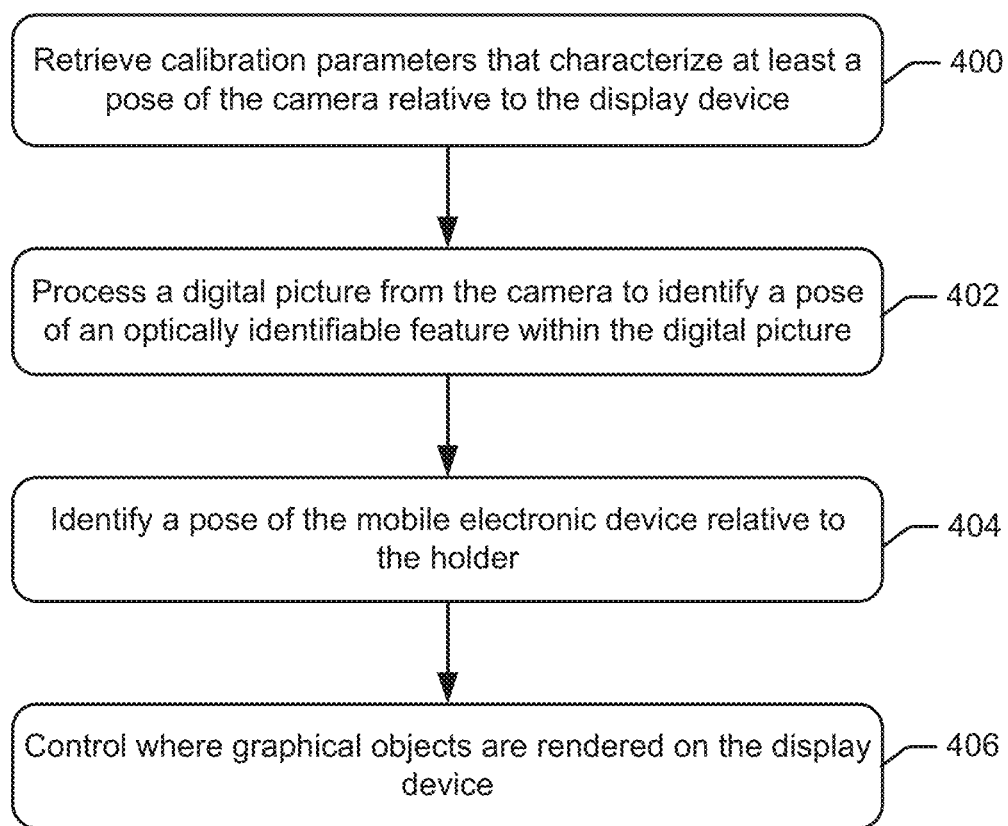
FIGS. 4-9 are flowcharts of operations that can be performed by a mobile electronic device in accordance with some embodiments of the present disclosure.

FIG. 4 is a flowchart of operations and methods that can be performed by a mobile electronic device to determine its pose relative to a headset. The headset includes a holder that is configured to releasably retain the mobile electronic device in a defined pose relative to the headset. The mobile electronic device includes a camera (e.g., 122 in FIG. 10), a display device (e.g., 1040 in FIG. 10), a processor (e.g., 1006 in FIG. 10) operationally connected to the camera and to the display device, and a memory (e.g., 1010 in FIG. 10) storing program code (e.g., 1012 in FIG. 10) that is executed by the processor to perform operations.

Referring to FIG. 4, the operations retrieve 400 calibration parameters from a memory that characterize at least a pose of the camera relative to the display device. A digital picture from the camera is processed 402 to identify a pose of an optically identifiable feature within the digital picture that was captured while the mobile electronic device is retained by the holder. A pose of the mobile electronic device is identified 404 relative to the holder based on the identified pose of the optically identifiable feature within the digital picture and based on at least the pose of the camera relative to the display device as characterized by the calibration parameters. The operations control 406 where graphical objects are rendered on the display device based on the identified pose of the mobile electronic device relative to the holder.

Accordingly, the mobile electronic device uses the camera to determine the device's pose relative to the headset, and then uses the relative pose to improve how graphical objects are rendered on the display device for viewing by a user wearing the headset.

Conditions for Triggering Calibration of Mobile Electronic Device Pose in the Headset Operations to calibrate the relative pose of a mobile electronic device relative to the headset may be triggered by receiving notification that the mobile electronic device has been inserted into the holder of the headset. The operations may responsively capture an image using a front-facing camera of the mobile electronic device, retrieve stored calibration parameters for the mobile electronic device and the headset, and determine new calibration parameters based on the captured image and the retrieved calibration parameters. In some embodiments, calibration operations are performed responsive to a calibration notification being triggered.

In one embodiment, a calibration notification is triggered when a new MR or VR application starts execution on the mobile electronic device, where the application is configured for use with a headset. In another embodiment, a calibration notification is triggered when the user initiates the recalibration operation by e.g., selecting a user-selectable indicia provided by the application.

In still another embodiment, starting a MR or VR application displays an image or text prompting the user to insert the mobile electronic device into the MR or VR headset. Subsequent successful insertion is detected by activating the front facing camera and repetitively checking to determine when the inside of the headset is captured. For example, digital picture from the front facing camera can be processed to identify a pose of an optically identifiable feature of the headset, such as the pads 310, the lenses, the eye openings, and/or other structural features or markings on the headset 300 in FIG. 3 or the headset 100 in FIGS. 1 and 2.

In another embodiment, corneal imaging techniques are used to detect the reflection of displayed virtual content on the user's eye cornea. A calibration notification is triggered when the image quality (distortion, location in the real world, etc.) no longer satisfies a defined quality rule, which may be at least partially specified by the user.

In another embodiment, digital pictures from the camera can be processed to track where the user's eye is directed. A calibration notification can be triggered based on determining that the user's eye is directed off-center from a desired location or is directed in another manner that satisfies a defined rule for triggering calibration.

Using a Front Facing Camera to Identify Pose of Optically Identifiable Feature

In some embodiments the optically identifiable feature pertains to a feature of the headset and/or a user's eye who is wearing the headset. A digital picture from a front facing camera of the mobile electronic device 120 may be processed 402 as part of the operations of FIG. 4 to identify a pose of an optically identifiable feature within the digital picture that was captured while the mobile electronic device is retained by the holder. The digital picture captured by the front facing camera may be processed to identify a pose of the user's eye relative to the camera.

For example, the operation to process (402 in FIG. 4) the digital picture from the camera to identify the pose of the optically identifiable feature within the digital picture that was captured while the mobile electronic device is retained by the holder, can include processing the digital picture to identify the pose of an optically identifiable feature of the headset that is captured by the camera.

The operations can further include determining from the calibration parameters retrieved (400 in FIG. 4) from the memory, a pose of the optically identifiable feature of the headset within a previous digital picture that was captured by the camera during a previous calibration process. The operation to process (402 in FIG. 4) the digital picture from the camera to identify the pose of the optically identifiable feature of the headset within the digital picture is performed during a present calibration process. The operation to identify (404 in FIG. 4) the pose of the mobile electronic device relative to the holder can be based on comparison of the identified pose of the optically identifiable feature of the headset within the digital picture that was captured during the present calibration process to the pose of the optically identifiable feature of the headset within the previous digital picture that was captured during the previous calibration process.

In some other embodiments, the optically identifiable feature that is identified by the mobile electronic device is a feature of a calibration pattern that is projected, e.g., flashed, by the display device onto the headset and/or the user's eye and reflected therefrom to be captured by the camera. The optically identifiable feature of the calibration pattern is processed as part of the operations to determine the pose of the mobile electronic device relative to the headset.

For example, the operations can further include displaying a calibration pattern on the display device for the camera to capture a portion of the calibration pattern within the digital picture by reflection of the portion of the calibration pattern from a surface of the headset and/or from an eye of the user. The operation to process (402 of FIG. 4) the digital picture from the camera to identify the pose of the optically identifiable feature within the digital picture, includes processing the digital picture to identify the pose of a defined feature within the portion of the calibration pattern.

Retrieve Stored Calibration Parameters for the Smartphone and Headset

As explained above the calibration parameters that are retrieved from the memory of the mobile electronic device characterize at least a pose of the camera relative to the display device. The calibration parameters may characterize other previously determined or defined relationships (relational positions, poses, etc.) between the mobile electronic device, the front camera, the back camera, the display device, the headset, the holder of the headset, a lens of the headset, and/or viewing ports of the headset. Alternatively or additionally, the calibration parameters may characterize operation of the camera(s), the display device, or other components of the mobile electronic device and/or the headset. For example, the calibration parameters may include any one or more of the following:

1) an optically identifiable feature and its location and/or a set of optically identifiable features and their relative poses, based on a digital picture captured from the front facing camera when the mobile electronic device was utilized during a prior calibration procedure;
2) a digital picture image captured from the front facing camera during a prior calibration procedure;
3) a distortion parameter(s) corresponding to the lens of the headset and/or the camera (e.g., barrel distortion), which may be determined during a prior calibration procedure and/or defined;
4) headset parameters characterizing a relation between the headset and eye coordinates determined during a prior calibration procedure; and
5) off-axis projection parameters characterizing a projection between eye coordinates and display coordinates of one or both of the user's eyes determined during a prior calibration procedure.

In one embodiment, the prior calibration procedure may be performed as an offline or factory calibration procedure. In another embodiment, the prior calibration procedure may be performed as a one-time calibration procedure performed on a per-user basis, and which may correspond to operations for a single-point active alignment method (SPAAM), such as disclosed by M Tuceryan and N. Navab, Single Point Active Alignment Method (SPAAM) for Optical See-Through HMD Calibration for AR, pages 149-158 in IEEE 2000.

In some further illustrative embodiments, the operations by the mobile electronic device can include determining, from the calibration parameters retrieved from the memory, distortion parameters of the camera affecting pose of the defined feature within the digital picture. The operation to process the digital picture from the camera to identify the pose of the optically identifiable feature within the digital picture can compensate for the distortion parameters of the camera.

The mobile electronic device may perform operations to determine, from the calibration parameters retrieved from the memory, headset-to-eye parameters identifying in at least a two-dimensional space distances between at least one location on the headset and at least one eye of the user determined during a previous calibration process. The operation to control where graphical objects are rendered on the display device may then be further performed based on the headset-to-eye parameters.

The mobile electronic device may perform operations to determine, from the calibration parameters retrieved from the memory, off-axis projection parameters identifying in at least a two-dimensional space distances between at least one location on the display device and at least one eye of the user determined during a previous calibration process operation to control where graphical objects are rendered on the display device may then be further performed based on the off-axis projection parameters.

Determination of New Calibration Parameters Based on Captured Digital Picture and Previously Stored Calibration Parameters Further operations that may be performed by a mobile electronic device are now described in the context of embodiments of FIGS. 11a, 11b, and 11c. FIG. 11a illustrates a back view of a headset and a side cross-sectional view of the headset retaining a mobile electronic device having a front camera (FCam) and a back camera (BCam). FIG. 11b illustrates a top cross-sectional view and a front cross-sectional view of the headset retaining the display device of the mobile electronic device at an optimal position relative to the headset. FIG. 11c illustrates a top cross-sectional view and a front cross-sectional view of the headset retaining the mobile electronic device at a suboptimal laterally shifted offset (delta) position relative to the headset. As will be explained in further detail below regarding FIG. 11c, the front-facing camera's field-of-view (FOV) of images generated by display on the display device, can be adjusted (e.g. laterally shifted) so that the left eye's viewport become smaller while the right eye's viewport becomes larger.

In the context of FIGS. 11a-c, the headset refers to a fixed part of the headset. The terms $E_{left}$ and $E_{right}$ refer to the position and orientation (e.g. pose) of the left and right virtual eye respectively, which optimally align with the real user's eyes. BCam is the pose of the back-facing camera, which may be only relevant for optical see-through head-mounted displays (OST-HMDs). FCam is the pose of the front-facing camera and "Display" refers to the physical position of the center of the display device of the mobile electronic device. FIGS. 11a-11c show an example FOV of the front-facing camera, where it seen that for many headsets and mobile electronic devices one of the eye openings will be inside the FOV of the front-facing camera. The front-facing camera may observe images that are output by the display device and reflected by a reflective surface of the headset and/or the user's eye back to the front-facing camera. Accordingly, the digital picture from the front-facing camera may include an image of the display device and/or an optically identifiable feature of the headset and/or the user's eye.

Two options of adjusting the viewport and projection matrices are possible based on whether positioning of the eye is possible or not. Both options may be applied separately, since they target different sources of error, or together to eliminate both errors.

Option 1 for Identifying the Pose of the Mobile Electronic Device Relative to the Holder:

Various example operations are described below for Option 1 for determining the pose of the mobile electronic device relative to the holder of the headset based on an optically identified feature of the headset. Using a digital picture from the front-facing camera, the mobile electronic device can identify (extract) one or more optically identifiable features of the headset and determine therefrom the pose of the mobile electronic device relative to the headset. Examples of such optically identifiable feature in the headset can include, without limitation, the headset's nose opening, eye opening, interior surface corners, and/or a printed indicia on a surface. Using defined/determined intrinsic camera parameters of the front-facing camera and the dimensions of the headset (which can be retrieved as calibration parameters from memory), the mobile electronic device can operate to derive a camera-to-headset transform $T_{FCam}^{Headset}$ that relates a pose of the camera to an optically identifiable feature of the headset within the digital picture. Calibration parameters can be retrieved from the memory that characterize a camera-to-display transform $T_{FCam}^{Display}$ that relates the pose of the camera to a pose of the display device, which may assume the fixed Headset pose is fixed midway between the two eye openings. A display-to-headset transform $T_{Display}^{Headset}$ is generated based on the camera-to-headset transform and the camera-to-display transform, such as based on $T_{Display}^{Headset} = T_{FCam}^{Headset} T_{FCam}^{Display^{-1}}$ which can relate the offset between the display centre and the headset's centre. Since the dimensions of the display device can be known (defined by the calibration parameters in a memory), this transform can be used to adjust for the shift between the viewports of the left and right eye to account for the delta shifted positions of the mobile electronic device shown in FIGS. 11b and 11c.

Figure 12:
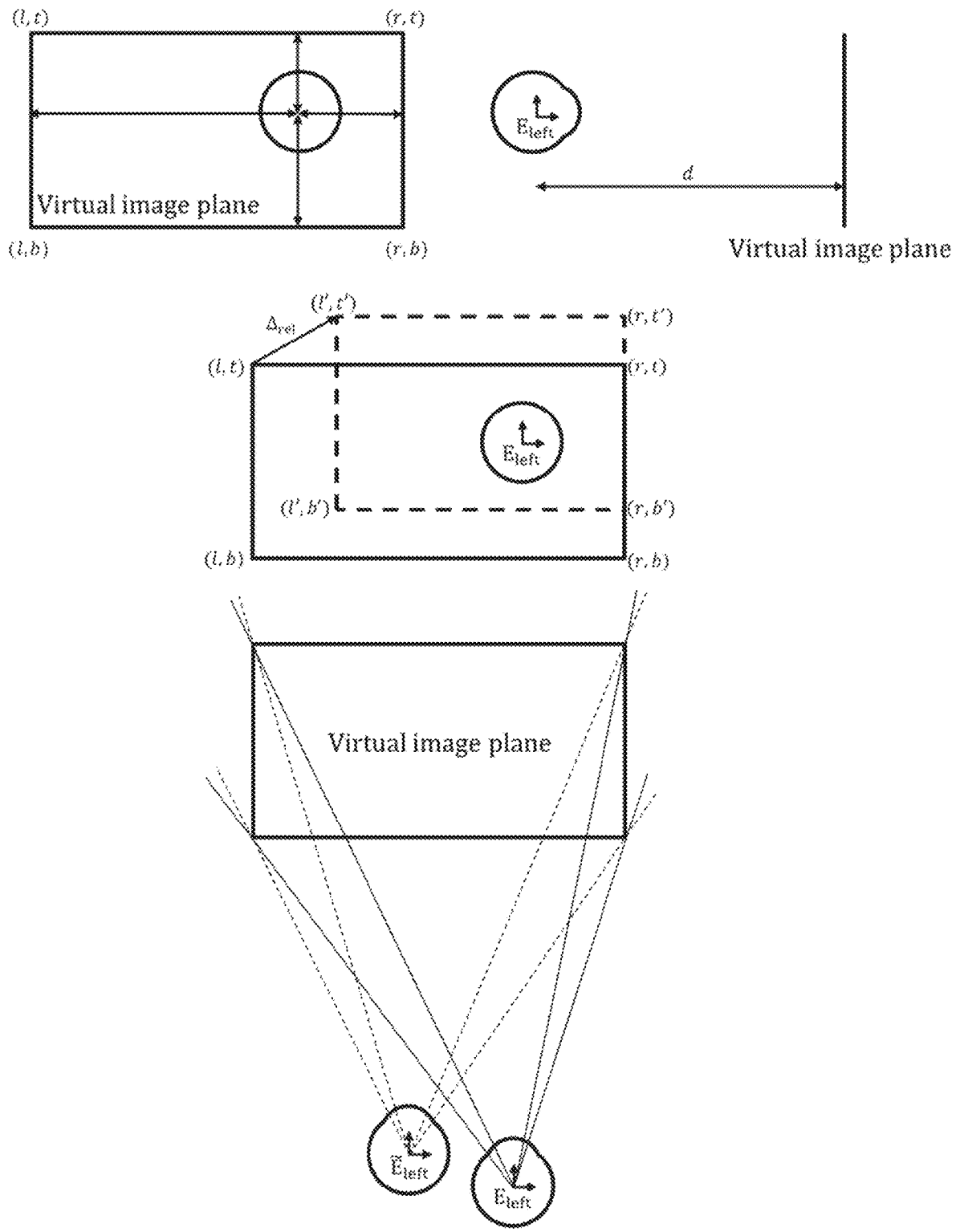
FIG. 12 illustrates various views of a virtual image plane where a user perceives the display device of the mobile electronic device to be located while the user is wearing the headset.

In addition to this adjustment, the mobile electronic device may account for non-linear distortion caused by optical systems between the screen and the user's eyes, such as the situation depicted in FIG. 12. FIG. 12 illustrates various views of a virtual image plane where a user perceives the display device of the mobile electronic device to be located while the user is wearing the headset. Referring to FIG. 12, a virtual display plane is positioned relatively to the eye at a distance d. The projection of such a configuration is described by an off-axis projection matrix such as the following:

$$P_{off} = \begin{pmatrix} \frac{2d}{r-l} & 0 & \frac{r+l}{r-l} & 0 \\ 0 & \frac{2d}{t-b} & \frac{t+b}{t-b} & 0 \\ 0 & 0 & -1 & 0 \end{pmatrix} = \begin{pmatrix} f_u & 0 & r_0 & 0 \\ 0 & f_v & c_0 & 0 \\ 0 & 0 & -1 & 0 \end{pmatrix}.$$

In the off—axis projection matrix the terms r, l, t, b referred to the corners of the virtual display plane's edges relative to the projection centre at the distance d. Thus, the parameters r, l, t, b, d describe the size and position of the image plane relative to the eye. The alternative and minimal parametrization of this projection matrix is given by $f_u$, $f_v$, $r_0$, $c_0$. Given such a minimal parametrization from a calibration procedure they can be adjusted to the changed viewport dimensions and position due to the smartphone shift. The distance d can be set to an arbitrary value and given the relative change in r, l, t, b the adjusted projection matrix can be calculated. Note that for the left eye's projection matrix r stays fixed, while for the right eye l stays fixed.

Figure 5:
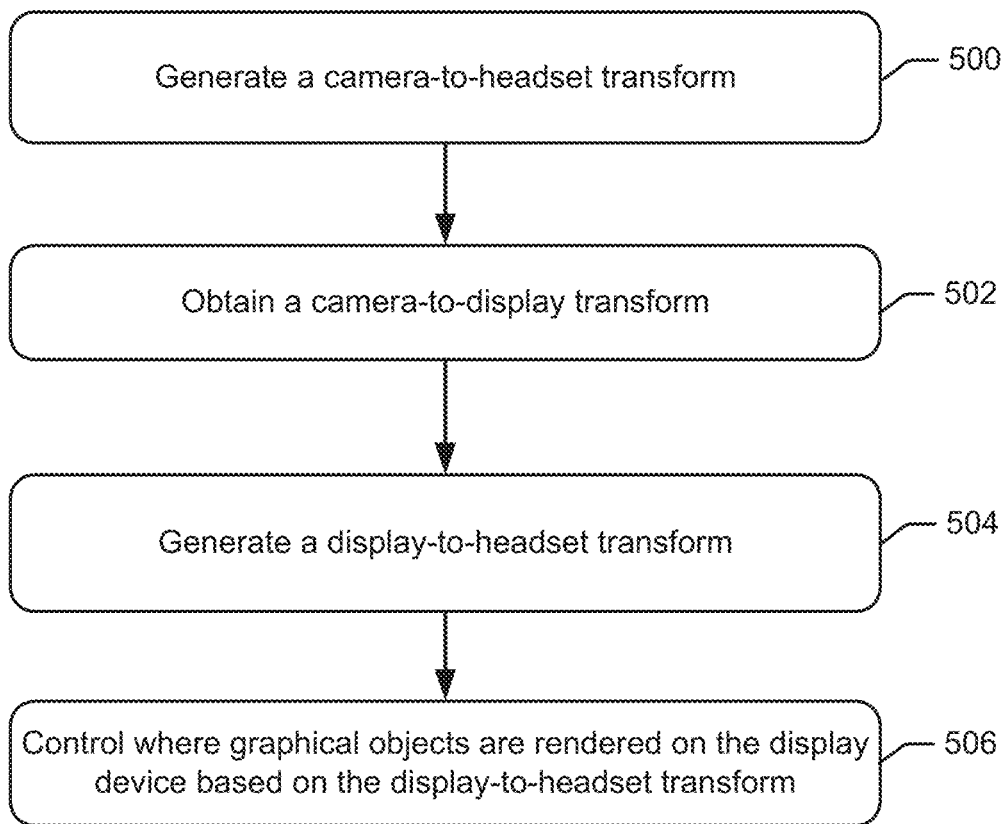

Various corresponding operations that may be performed by the mobile electronic device are illustrated in the flowchart of FIG. 5. Referring to FIG. 5, the operation to identify the pose of the mobile electronic device relative to the holder based on the identified pose of the optically identifiable feature within the digital picture and based on at least the pose of the camera relative to the display device as characterized by the calibration parameters, can include generating 500 a camera-to-headset transform that relates a pose of the camera to an optically identifiable feature of the headset within the digital picture. A camera-to-display transform is obtained 502 that relates the pose of the camera to a pose of the display device. A display-to-headset transform is generated 504 based on the camera-to-headset transform and the camera-to-display transform. The operation to control 506 where graphical objects are rendered on the display device based on the identified pose of the mobile electronic device relative to the holder, can be performed based on the display-to-headset transform.

A further operation that may be performed by the mobile electronic device includes determining from the calibration parameters retrieved from the memory, distortion parameters of the camera affecting pose of the optically identifiable feature of the headset within the digital picture. The operation to generate the camera-to-headset transform can be performed to compensate for the distortion parameters of the camera.

The operation to obtain the camera-to-display transform that relates the pose of the camera to the pose of the display device, may include processing the digital picture or another digital picture from the camera to identify, from a reflected image which is generated by an image from the display device being reflected by a reflective surface of the headset to the camera, distances between the camera and the display device relative to at least a two-dimensional coordinate system. The mobile electronic device may then generate the camera-to-display transform based on the distances between the camera and the display device.

The operation to generate the camera-to-display transform based on the distances between the camera and the display device, may include obtaining data characterizing distances between the holder and the reflective surface of the headset that produced the reflected image. The mobile electronic device may then generate the camera-to-display transform based on scaling the distances between the camera and the display device identified in the reflected image based on the data characterizing the distances between the holder and the reflective surface of the headset.

Option 2 for Identifying the Pose of the Mobile Electronic Device Relative to the Holder:

Various example operations are described below for Option 2 for determining the pose of the mobile electronic device relative to the holder of the headset based on an identified pose of the user's eye.

The mobile electronic device can perform further operations to adjust for a change in the user's eye pose relative to the headset, such as shown in FIG. 12, which may be due to a changed headset placement and/or a different user who is wearing the headset. The virtual image plane is characterized by that its projection can be correct independent of the real eye position (i.e. given a moving eye, the real world will exhibit the same movement as the virtual image plane). All content in front or behind this plane will exhibit an error due to the difference between the virtual eye position E and the real eye position $\tilde{E}$. When the headset's front-facing camera can capture the eye position, the mobile electronic device can process the digital picture to compute both position matrices $p_{FCam}^{E}$ and $p_{FCam}^{\tilde{E}}$. The matrix $p_{FCam}^{E}$ characterizes how the virtual camera is positioned relative to the front camera, and normally this will be set during the initial calibration phase. The matrix $p_{FCam}^{\tilde{E}}$ characterizes the position of the user's actual eye, relative to the front camera, which might now be different as during the initial calibration, due to another using the headset or a different headset position. The position can be determined by finding a fixed position of the eye, i.e. the eye corner and setting the depth to a fixed value. Alternative techniques that may include corneal imaging could also be used to infer the eye position (including the depth) using the front camera. To adjust the virtual eye position and adjust the projection matrix, the following equation may be used which characterizes the shift in eye position in the headset coordinate system:

$$\Delta_{Headset}^{E} = (p_{FCam}^{E} - p_{FCam}^{\tilde{E}}) \cdot T_{Headset}^{FCam}$$

This shift should be applied to both the position of the virtual camera and to the projection matrix, such that the projection of the virtual image plane remains unchanged similar to the relationships shown in FIG. 12. For example, when $\Delta_{Headset}^{E}$ indicates that the eye position has moved 5 mm down, the virtual eye position will be shifted down 5 mm as well. In addition, the projection matrix $P_{off}$ is adjusted by increasing t by 5 mm and decreasing b by 5 mm. The other parameters will remain unchanged.

Figure 6:
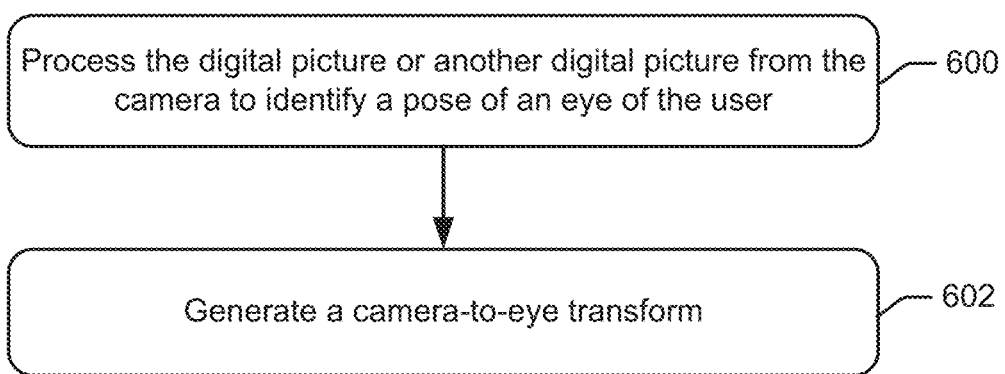

Various corresponding operations that may be performed by the mobile electronic device are illustrated in the flowchart of FIG. 6. Referring to FIG. 6, the operations may include processing 600 the digital picture or another digital picture from the camera to identify a pose of an eye of the user, and generating 602 a camera-to-eye transform that relates the pose of the camera to the identified pose of the eye of the user. The operation to control 406 (FIG. 4) where graphical objects are rendered on the display device may then be further performed based on the camera-to-eye transform.

In one embodiment, when the mobile electronic device detects that it is posed in the headset with a location and orientation which cannot achieve a desired image quality, the message may be displayed to the user which indicates that the mobile electronic device should be repositioned by the user. The displacement/rotation to be applied to the mobile electronic device may be computed based on the previous embodiments in this step and indicated by notification to the user (e.g. message indicating recommended movement left/right/up/down/rotate left, right, etc. until a more optimal positioning of the device is achieved).

Figure 7:
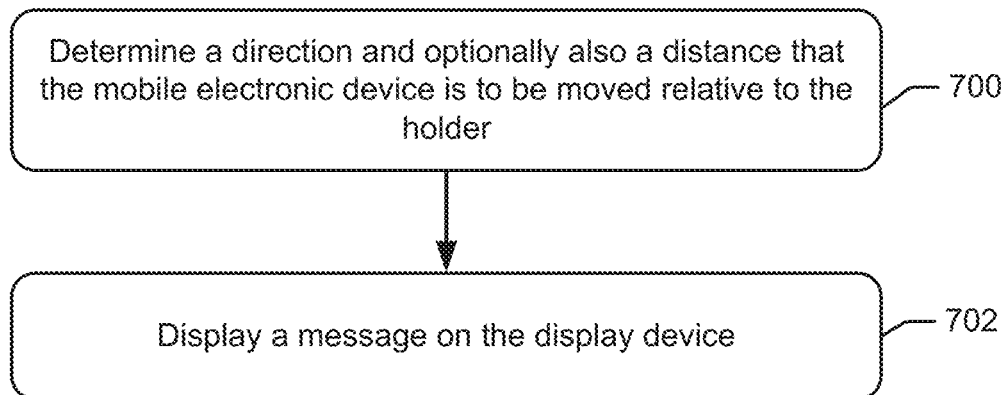

In a further embodiment, the mobile electronic device may notify the user how the mobile electronic device should be moved to obtain improved operation with the headset. FIG. 7 is a flowchart of operations that may be performed by the mobile electronic device according to one embodiment. Referring to FIG. 7, the operations can include responding to the identified pose of the mobile electronic device relative to the holder exceeding an offset threshold value, by determining 700 a direction and a distance that the mobile electronic device is to be moved relative to the holder so the display device is within a threshold distance of a defined location on the holder and then displaying 702 a message on the display device that indicates the direction and the distance that the mobile electronic device is to be moved.

In another embodiment, the mobile electronic device may provide dynamic notification updates as the user moves the mobile electronic device seeking to obtain a more optimal pose that will provide improved operation. For example, the mobile electronic device may respond to the identified pose of the mobile electronic device relative to the holder exceeding an offset threshold value, by determining a direction and/or angular orientation that the mobile electronic device is to be moved relative to the holder so the display device is within a threshold distance of a defined location on the holder. The mobile electronic device can display a message on the display device that indicates the direction and/or angular orientation that the mobile electronic device should be moved. The mobile electronic device can repeat the operations for determining the direction/angular orientation and displaying further messages that indicates the direction that the mobile electronic device should be moved until the mobile electronic device is within the threshold distance of the defined location/orientation on the holder.

The inference of what are the location and orientations of the mobile electronic device which result in an image quality lower than desired may be computed a priori based on factory or user tests, or based on calibration parameters that characterize the optical system and structure of a given headset.

In another embodiment, the most prominent features are checked first and further analysis is only performed if a predefined detection offset threshold is exceeded in these features. In that case, the position and size of the two eyes' viewports can be initially adjusted according to a process that seeks to optimize based on the current pose of the mobile electronic device. The off-axis projection matrices may be adjusted to account for the changed viewport sizes and the distortion parameters are adjusted to account for the new distortion centres.

In another embodiment, in addition to the adjustments mentioned in the previous embodiment, the image from the front-camera may be used to estimate the position of the user's eye. The projection matrices and the distortion parameters may be adjusted accordingly based on this estimated position and the one calculated during the calibration phase (a priori or factory). If the position of only one eye can be observed by the front-facing camera, the offset between the observed and the calibrated position of the eye can be considered as the head offset. Hence, this offset can be applied to the second eye as well. Alternatively, a manual calibration scheme can be applied to compensate for the missing information.

Further Types of Calibration Parameters which can be Retrieved from Memory:

Further to the description above, other types of calibration parameters can be retrieved by the mobile electronic device from memory that characterize various different characteristics of the camera, the display device, the various pose transformations, etc. For example, the calibration parameters may characterize operational parameters and/or intrinsic parameters of the front-facing camera and/or back-facing camera. Calibration parameters may characterize the relative pose of the back-facing camera to the front-facing camera, transform $T_{FCam}^{BCam}$, and/or the relative pose of the display to the back-facing camera, transform $T_{Display}^{BCam}$, which may be useful for AR applications.

The calibration parameters may characterize the relative position of the front-facing camera to the display device, transform $T_{FCam}^{Display}$.

The calibration parameters may characterize characteristics of the display device, such as a front-camera notch and/or the pixel density, e.g. pixel-centimeter ratio.

In one embodiment, all or some of these parameters are provided by the mobile electronic device software development kit (SDK) or from a pre-built database.

In another embodiment, the intrinsic parameters are obtained by the headset user by performing a classical calibration method for the front and back facing cameras (e.g. by recording a video of a checker board).

In another embodiment, the relative position of the back-facing camera is estimated by a manual user calibration step, such as the SPAAM method. The calibration step may include having the user align a virtual object with its real world correspondence (e.g. marker) in different positions. The user communicates to the mobile electronic device when an alignment has happened (e.g. via a user-selectable indicia, a clicker or a sensed hand gesture). These points are later used to retrieve the transformation between the back camera and the mobile electronic device (front camera or display device). In one embodiment, the number of points is predefined by the headset manufacturer. In another embodiment, points can be collected until convergence of the projection is achieved. In another embodiment, after a point is collected, the projection is updated which can be used to display the real-world object representation in the virtual world. When the user determines or the mobile electronic device determines that the alignment satisfies a defined rule, the calibration is finished.

In another embodiment, a digital picture from the camera is used to retrieve the transform $T_{FCam}^{Display}$. Given the transform $T_{FCam}^{Headset}$ estimated during a prior calibration, and the characteristics of the mirrors/optical elements of the headset, which may be defined by the manufacturer, the reflection of the display is used to determine the transform $T_{FCam}^{Display}$. In order to correctly use the pose of the display's reflection, some arbitrary shape may be displayed when the image is captured (e.g. highlighted corner).

In another embodiment, using the information from a previously described embodiment, and using a displayed background image along with the shape from the previous embodiment, the size of the screen and/or the pixel density, e.g. pixel to centimeter ratio, can be estimated. The same digital picture can also be used to detect display characteristics, such as the screen shape (e.g. a screen having a notched portion to accommodate an ear speaker, camera, microphone, etc.).

Figure 8:
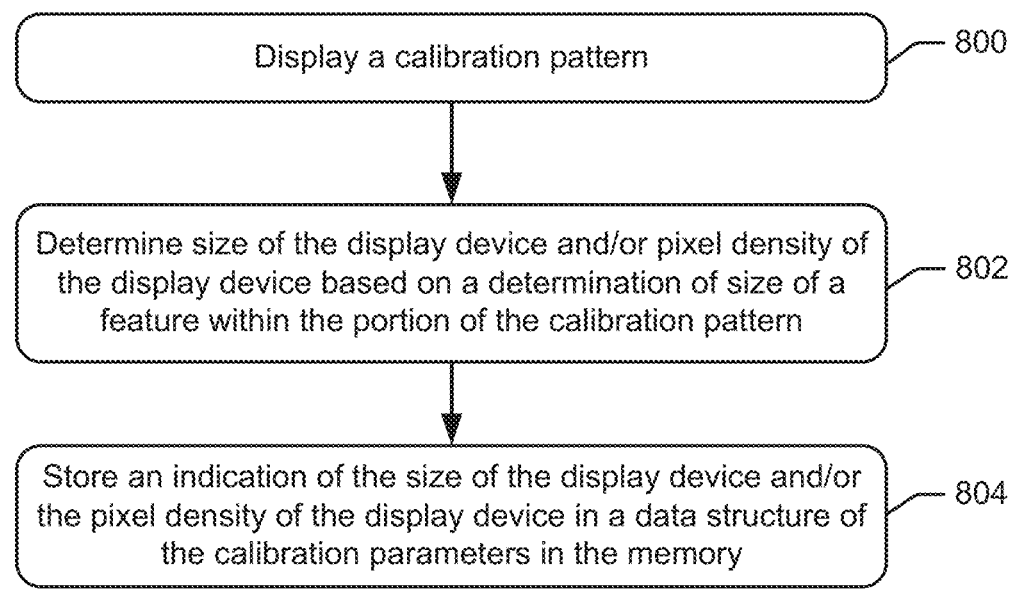

Corresponding operations that may be performed by the mobile electronic device of are illustrated in the flowchart of FIG. 8 according to one embodiment. Referring to FIG. 8, the operations display 800 a calibration pattern on the display device for the camera to capture a portion of the calibration pattern within the digital picture or another digital picture by reflection of the portion of the calibration pattern from a surface of the headset and/or from an eye of the user. The operations determine 802 size of the display device and/or pixel density of the display device based on a determination of size of a feature within the portion of the calibration pattern. The operations may then store 804 an indication of the size of the display device and/or the pixel density of the display device in a data structure of the calibration parameters in the memory.

Figure 9:
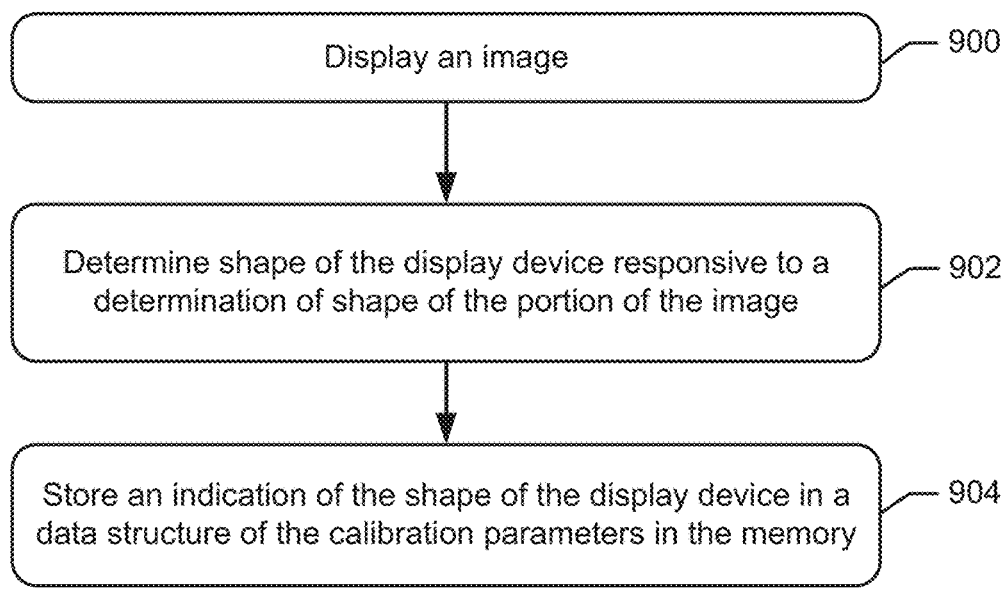

FIG. 9 is a flowchart of operations that may be performed by the mobile electronic device according to one embodiment. Referring to FIG. 9, the operations can include displaying 900 an image on the display device. The camera can be operated to capture a reflection of the image displayed by the display device and reflected by a surface of the headset and/or by an eye of the user. The operations can determine 902 shape of the display device based on a determination of shape of the reflected image, and store 904 an indication of the shape of the display device in a data structure of the calibration parameters in the memory.

Cloud Implementation

Some or all operations described above as being performed by a mobile electronic device may alternatively be performed by another node that is part of a network cloud computing resource. For example, these operations can be performed as a network function by a cloud server or a cloud resource of a network operator, such as a gaming or other entertainment server, map travel routing server, eCommerce server, etc.

Example Mobile Electronic Device Configurations

FIG. 10 is a block diagram of components of a mobile electronic device 120 that are configured to operate in accordance with some other embodiments of the present disclosure. The mobile electronic device 120 can include a camera (e.g. a front-facing camera 122, a back-facing camera 1050, and/or a plurality of front/back facing cameras), a display device 1040, at least one processor circuit 1006 (processor), and at least one memory 1010 (memory). The mobile electronic device 120 may further include wireless network interface circuitry 1030, a motion sensor and/or orientation sensor 1060, and/or a speaker 1070. The sensor 1060 may include an inertial measurement unit which outputs signals that are processed by the processor 1006 to determine the pose and/or movement of the mobile electronic device 120. The wireless network interface circuit 1030 may be configured to communicate with another electronic device through a wireless (e.g., Wi-Fi, Bluetooth, cellular, etc.) network interface.

The processor 1006 is operationally connected to these various components. The memory 1010 stores program code 1012 that is executed by the processor 1006 to perform operations. The processor 1006 may include one or more data processing circuits, such as a general purpose and/or special purpose processor (e.g., microprocessor and/or digital signal processor), which may be collocated or distributed across one or more data networks. The processor 1006 is configured to execute computer program instructions among program code 1012 in the memory 1010, described below as a computer readable medium, to perform some or all of the operations and methods for one or more of the embodiments disclosed herein for a mobile electronic device.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

The invention claimed is:

1. A mobile electronic device for a headset including a holder configured to releasably retain the mobile electronic device in a defined pose relative to the headset, the mobile electronic device comprising:
    a camera configured to output digital pictures and arranged by the holder to view a portion of the headset;
    a display device arranged by the holder to display information for viewing by a user wearing the headset;
    a processor operationally connected to the camera and to the display device; and
    a memory storing program code that is executed by the processor to perform operations comprising:
        processing a digital picture from the camera to identify a pose relative to the camera of an optically identifiable feature of the headset within the digital picture that was captured by the camera while the mobile electronic device is retained by the holder; and
        controlling where graphical objects are rendered on the display device based on the identified pose relative to the camera of the optically identifiable feature within the digital picture.

2. The mobile electronic device of claim 1, wherein the operations further comprise controlling where graphical objects are rendered on the display device further based on a defined relationship between a pose of the camera and a pose of the display device.

3. The mobile electronic device of claim 1, wherein the operation of controlling where graphical objects are rendered on the display device based on the identified pose relative to the camera of the optically identifiable feature within the digital picture comprises:
    identifying a pose of the mobile electronic device relative to the holder based on the identified pose relative to the camera of the optically identifiable feature within the digital picture and based on a defined relationship between a pose of the camera and a pose of the mobile electronic device; and
    controlling where graphical objects are rendered on the display device based on the identified pose of the mobile electronic device relative to the holder.

4. The mobile electronic device of claim 1, wherein the optically identifiable feature of the headset is configured to have a static pose relative to the holder retaining the mobile electronic device.

5. The mobile electronic device of claim 1, wherein the operations further comprise:
    determining a pose of the optically identifiable feature of the headset within a previous digital picture that was captured by the camera during a previous calibration process,
    wherein the operation to process the digital picture from the camera to identify the pose of the optically identifiable feature of the headset within the digital picture is performed during a present calibration process, and
    further comprising identifying pose of the mobile electronic device relative to the holder based on comparison of the identified pose of the optically identifiable feature of the headset within the digital picture that was captured during the present calibration process to the pose of the optically identifiable feature of the headset within the previous digital picture that was captured during the previous calibration process.

6. The mobile electronic device of claim 1, wherein the operations further comprise:
    displaying a calibration pattern on the display device for the camera to capture a portion of the calibration pattern within the digital picture by reflection of the portion of the calibration pattern from a surface of the headset and/or from an eye of the user, and
    the operation to process the digital picture from the camera to identify the pose relative of the camera of the optically identifiable feature within the digital picture, comprises processing the digital picture to identify the pose of a defined feature within the portion of the calibration pattern.

7. The mobile electronic device of claim 1, wherein the operations further comprise:
    obtaining distortion parameters of the camera affecting pose of the defined feature within the digital picture,
    wherein the operation to process the digital picture from the camera to identify the pose relative to the camera of the optically identifiable feature within the digital picture compensates for the distortion parameters of the camera.

8. The mobile electronic device of claim 1, wherein the operations further comprise:
    obtaining headset-to-eye parameters identifying in at least a two-dimensional space distances between at least one location on the headset and at least one eye of the user,
    wherein the operation to control where graphical objects are rendered on the display device is further performed based on the headset-to-eye parameters.

9. The mobile electronic device of claim 1, wherein the operations further comprise:
    obtaining off-axis projection parameters identifying in at least a two-dimensional space distances between at least one location on the display device and at least one eye of the user, wherein the operation to control where graphical objects are rendered on the display device is further performed based on the off-axis projection parameters.

10. The mobile electronic device of claim 1, further comprising:
generating a camera-to-headset transform that relates a pose of the camera to an optically identifiable feature of the headset within the digital picture;
obtaining a camera-to-display transform that relates the pose of the camera to a pose of the display device; and
generating a display-to-headset transform based on the camera-to-headset transform and the camera-to-display transform; and
the operation to control where graphical objects are rendered on the display device based on the identified pose relative to the camera of the optically identifiable feature within the digital picture, is performed based on the display-to-headset transform.

11. The mobile electronic device of claim 10, wherein the operations further comprise:
obtaining distortion parameters of the camera affecting pose of the optically identifiable feature of the headset within the digital picture,
wherein the operation to generate the camera-to-headset transform compensates for the distortion parameters of the camera.

12. The mobile electronic device of claim 10, wherein the operation to obtain the camera-to-display transform that relates the pose of the camera to the pose of the display device, comprises:
processing the digital picture or another digital picture from the camera to identify from a reflected image, which is generated by an image from the display device being reflected by a reflective surface of the headset to the camera, distances between the camera and the display device relative to at least a two-dimensional coordinate system; and
generating the camera-to-display transform based on the distances between the camera and the display device.

13. The mobile electronic device of claim 12, wherein the operation to generate the camera-to-display transform based on the distances between the camera and the display device, comprises:
obtaining data characterizing distances between the holder and the reflective surface of the headset that produced the reflected image; and
generating the camera-to-display transform based on scaling the distances between the camera and the display device identified in the reflected image based on the data characterizing the distances between the holder and the reflective surface of the headset.

14. The mobile electronic device of claim 1, wherein the operations further comprise:
responsive to the identified pose relative to the camera of the optically identifiable feature within the digital picture exceeding an offset threshold value,
determining a direction and a distance that the mobile electronic device is to be moved relative to the holder so the display device is within a threshold distance of a defined location on the holder, and
displaying a message on the display device that indicates the direction and the distance that the mobile electronic device is to be moved.

15. The mobile electronic device of claim 1, wherein the operations further comprise:
determining a pose of the mobile electronic device relative to the holder,
responsive to the pose of the mobile electronic device relative to the holder exceeding an offset threshold value,
determining a direction that the mobile electronic device is be moved relative to the holder so the display device is within a threshold distance of a defined location on the holder,
displaying a message on the display device that indicates the direction that the mobile electronic device should be moved, and
repeating the determination of the direction and the display of another message that indicates the direction that the mobile electronic device should be moved until the mobile electronic device is within the threshold distance of the defined location on the holder.

16. The mobile electronic device of claim 1, wherein the operations further comprise:
displaying a calibration pattern on the display device for the camera to capture a portion of the calibration pattern within the digital picture or another digital picture by reflection of the portion of the calibration pattern from a surface of the headset and/or from an eye of the user; and
determining size of the display device and/or pixel density of the display device based on a determination of size of a feature within the portion of the calibration pattern,
wherein the controlling of where graphical objects are rendered on the display device is further based on the size of the display device and/or the pixel density of the display device.

17. The mobile electronic device of claim 1, wherein the operations further comprise:
operating the camera to capture a reflection of an image that is displayed by the display device and reflected by a surface of the headset and/or by an eye of the user;
determining shape of the display device based on a determination of shape of the reflected image; and
wherein the controlling of where graphical objects are rendered on the display device is further based on the shape of the display device.

18. A method of performing operations by a processor of a mobile electronic device that includes a camera and a display device for use with a headset including a holder configured to releasably retain the mobile electronic device in a defined pose relative to the headset, the method comprising:
processing a digital picture from the camera to identify a pose relative to the camera of an optically identifiable feature of the headset within the digital picture that was captured by the camera while the mobile electronic device is retained by the holder; and
controlling where graphical objects are rendered on the display device based on the identified pose relative to the camera of the optically identifiable feature within the digital picture.

19. A computer program product for a processor of a mobile electronic device that includes a camera and a display device for use with a headset including a holder configured to releasably retain the mobile electronic device in a defined pose relative to the headset, the computer program product comprising:
a non-transitory computer readable medium storing program code executable by the processor of the mobile electronic device to perform operations comprising:
processing a digital picture from the camera to identify a pose relative to the camera of an optically identifiable feature of the headset within the digital picture that was captured by the camera while the mobile electronic device is retained by the holder; and controlling where graphical objects are rendered on the display device based on the identified pose relative to the camera of the optically identifiable feature within the digital picture.

\* \* \* \* \*